(12) United States Patent
Tohdo et al.

(10) Patent No.: US 7,499,782 B2
(45) Date of Patent: Mar. 3, 2009

(54) SYSTEM FOR REAL-TIME CONTROL PERFORMED ON TIME-DEPENDENT DATA TRANSMITTED/RECEIVED IN VEHICLE

(75) Inventors: Tetsuya Tohdo, Anjo (JP); Masayuki Kobayashi, Anjo (JP); Ryusuke Fukui, Kariya (JP); Takeshi Suganuma, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 586 days.

(21) Appl. No.: 11/037,454

(22) Filed: Jan. 19, 2005

(65) Prior Publication Data

US 2005/0159870 A1 Jul. 21, 2005

(30) Foreign Application Priority Data

Jan. 19, 2004 (JP) ............................. 2004-010612

(51) Int. Cl.
*B60R 22/00* (2006.01)
(52) U.S. Cl. ............................... 701/48; 701/1; 701/33; 701/36; 701/66; 340/438; 340/439
(58) Field of Classification Search ................... 701/33, 701/36, 48, 66, 93, 1; 340/438, 439
See application file for complete search history.

(56) References Cited

U.S. PATENT DOCUMENTS 4,497,057 A * 1/1985 Kato et al. ..................... 714/46

FOREIGN PATENT DOCUMENTS

| JP | 6-30472 | 2/1994 |
|---|---|---|
| JP | 2003-027981 | 1/2003 |
| JP | 2003-248736 | 9/2003 |

OTHER PUBLICATIONS

Office Action dated Oct. 7, 2008 in JP Patent Application No. 2004-010612 with English translation.

\* cited by examiner

*Primary Examiner*—Gertrude Arthur Jeanglaud
(74) *Attorney, Agent, or Firm*—Nixon & Vanderhye PC (57) ABSTRACT

In a vehicle control system which requires a plurality of ECUs (electronic control units) to control in real time states of the vehicle using time-dependent data transmitted and received among the ECUs. The time-dependent data reflecting the vehicle states is detected or produced. A transmitting ECU, one of the plural ECUs, transmits the time-dependent data with a degree of newness thereof to a receiving ECU, another one of the plural ECUs, which takes part in the real-time control. The receiving ECU determines whether or not the time-dependent data has expired for the real-time control based on the degree of newness of the time-dependent data and performs processing with the time-dependent data based on determined results of the expiration, the processing having the time-dependent data adapted to the real-time control. Thus the real-time control can be performed based on only the adaptive time-dependent data to the real-time control.

26 Claims, 6 Drawing Sheets

SYSTEM FOR REAL-TIME CONTROL PERFORMED ON TIME-DEPENDENT DATA TRANSMITTED/RECEIVED IN VEHICLE

CROSS REFERENCES TO RELATED APPLICATIONS

The present application relates to and incorporates by reference Japanese Patent application No. 2004-10612 filed on Jan. 19, 2004.

BACKGROUND OF THE INVENTION

1. Field of the Invention

The present invention relates to a control system mounted on a vehicle, and in particular, to a real-time control system provided with a plurality of ECUs (electronic control unit) performing real-time control for the vehicle based on time-dependent data transmitted and received between the plurality of ECUs.

2. Description of the Related Art

There has been a conventional system in which a plurality of ECUs (electric control unit) are mounted on a vehicle and time-dependent data is transmitted and received between the ECUs via signal lines such as an in-vehicle LAN, and this transmitted/received time-dependent data is used as a basis to achieve one of the vehicle real-time controls. The time-dependent data refers to data that consistently changes based on the vehicle running condition and condition outside the vehicle. The real-time control refers to control under which the time-dependent data for use in the control is ideally an amount dependent on the instant time at which the control is actually performed in sequence.

Examples of such a system include an auto cruise control system (Auto Cruise Control). In the auto cruise control system, a forward-obstacle identification system such as a laser-radar sensor first feeds to the inter-vehicle distance control ECU a signal indicating spacing to the preceding vehicle and others. The inter-vehicle distance control ECU then uses this fed signal as a basis to compute a target running speed for keeping a proper distance between the vehicles, and outputs computed result signals to an engine ECU. The engine ECU, to run the vehicle at the target running speed of the received signal, determines operation contents of actuators, such as the electronic throttle, injector, and ignition plug, and then controls these actuators according to the determined results. The target running speed data for use in the actuator control is ideally an amount based on the inter-vehicle distance at the control time.

In such a system which uses the time-dependent data transmitted and received between a plurality of ECUs as a basis for the vehicle real-time control, if the time-dependent data is not transmitted and received within a proper time and is delayed, the control may be performed based on the time-dependent data at the old time, and a large difference may occur between the actual-control time and the time of the time-dependent data for use in the control, as a result of which mismatching may occur in the vehicle real-time control.

In the adaptive cruise control system as mentioned above, for example, if a large difference exists between the time at which the forward-obstacle identification system detects the distance to the preceding vehicle, and outputs it and the time at which the engine ECU uses this detected distance as a basis to finally control the actuators, the vehicle has to control the vehicle-running speed and other parameters based on a considerable-previous inter-vehicle distance, thereby making it difficult to keep the proper inter-vehicle distance.

The time-dependent data between ECUs are not transmitted or received within a proper time and are delayed in cases in which, for example, (1) the data is transmitted and received via an in-vehicle LAN that is busy for other data transmissions, and (2) any of ECUs that transmits and receives data has to process a large amount of data such as image, so that the relevant ECU has more processing load and the time-dependent data transmitted and received is sent and received in a delayed manner.

To decrease such mismatching in the vehicle real-time control, it is preferable that among the time-dependent data transmitted and received between ECUs, the time-dependent data transmitted and received within a proper time is differently treated from the time-dependent data that is not transmitted and received within a proper time.

SUMMARY OF THE INVENTION

In light of the above-described problems, an object of the present invention is to provide a vehicle real-time control system including a plurality of ECUs and using a transmitted/received time-dependent data transmitted and received between the plurality of ECUs as a basis for vehicle real-time control, in which an operation can be performed based on whether the relevant transmitted/received time-dependent data is transferred between the plurality of ECUs within a proper time.

To achieve the above-described object, as one aspect of the present invention, there is provided a system for controlling in real time states of a vehicle, in which the real-time control is performed based on time-dependent data transmitted and received among a plurality of ECUs (electronic control units) dedicated to the control of the states of the vehicle. The system comprises a determination unit determining whether or not the time-dependent data has expired for the real-time control based on a degree of newness of the time-dependent data to be received; and a processing unit performing processing with the time-dependent data based on results of the expiration determined by the determination unit, the processing having the time-dependent data adapted to the real-time control.

The control system according to the present invention thus causes the determination unit to use the degree of newness of the time-dependent data for the vehicle real-time control as a bases to determine whether the data has expired. And the system uses the determined results as a basis to process the time-dependent data, so that the system can perform an operation based on whether the time-dependent data is transferred between the plurality of ECUs within a proper time.

The degree of newness (i.e., freshness) refers to a concept including time such as creation time of the relevant time-dependent data to be transmitted and received, the detection time of a sensed value if the relevant data is based on the sensed value, the reception time of the relevant sensed value, and the expiration time of the relevant data.

The processing unit performs "data processing" that refers to "processing for reducing mismatching in the vehicle real-time control" and that is a concept including processing such as processing for real-time control of the relevant data and processing for deleting the relevant data. The "processing for real-time control" includes real-time control processing itself as well as processing performed as pre-processing for the real-time control. The real-time control is a concept including hard real-time control and soft real-time control.

Preferably, in the foregoing system configuration, both the determination unit and the processing unit are incorporated in an ECU of the plurality of ECUs, the ECU receiving the time-dependent data. It is also preferred that the system further comprises a sensor detecting information about the status of the vehicle as the time-dependent data to be given to a further ECU of the plurality of ECUs, the further ECU transmitting the time-dependent data to the receiving ECU either directly or indirectly.

As another aspect, the present invention provides a method of preparing time-dependent data used for controlling in real time states of a vehicle, in which the real-time control is performed based on the time-dependent data transmitted and received among a plurality of ECUs (electronic control units) dedicated to the control of the states of the vehicle, the method comprising steps of: making a specified ECU among the plurality of ECUs (i) either receive the time-dependent data from a sensor to detect the states of the vehicle or produce the time-dependent data by calculation, (ii) add information indicative of a degree of newness of the time-dependent data to the received or produced time-dependent data, and (iii) transmit the time dependent data with the information indicative of the degree of newness to a further specified ECU among the plurality of ECUs; and making the further specified ECU (iv) determine whether or not the time-dependent data that has been received has expired for the real-time control based on the degree of newness added to the time-dependent data; and (v) perform processing with the time-dependent data based on determined results of the expiration, the processing having the time-dependent data adapted to the real-time control.

This method is also able to provide the identical advantages to the foregoing.

DETAILED DESCRIPTION OF THE PREFERRED EMBODIMENTS

First Embodiment

Referring to FIGS. 1 to 5, a first embodiment of a real-time control system of the present invention will now be described.

Figure 1:
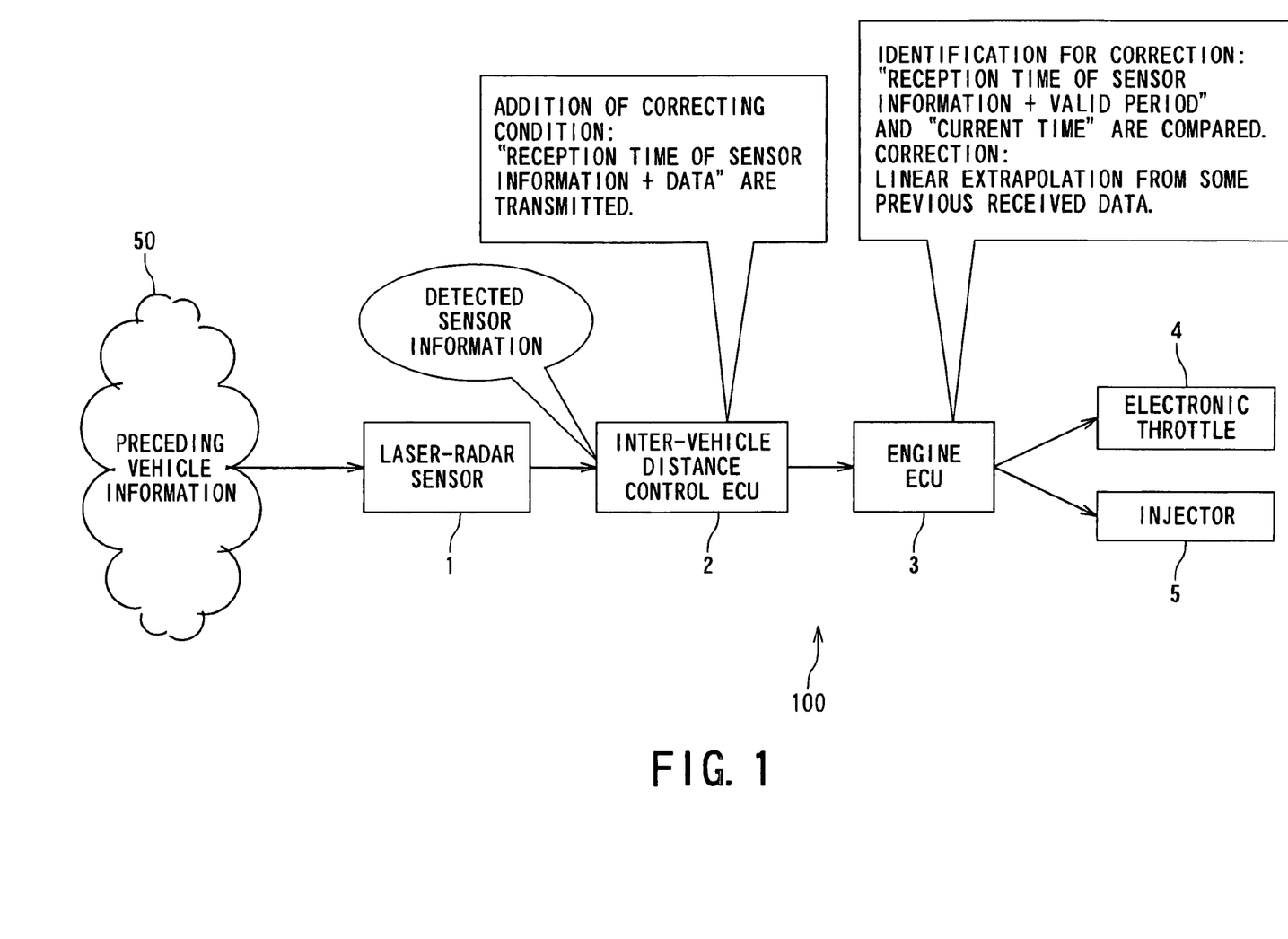
FIG. 1 shows a schematic diagram of vehicle real-time control system according to a first embodiment of the present invention.

FIG. 1 shows a schematic diagram of a real-time control system 100 mounted on a vehicle (hereinafter, referred to as a vehicle real-time control system 100) according to a first embodiment of the present invention. The vehicle real-time control system 100 includes a laser-radar sensor 1, inter-vehicle distance control ECU 2 (which corresponds to a transmission ECU), engine ECU 3 (which corresponds to a reception ECU), electronic throttle 4, injector 5, and others.

The laser-radar sensor 1 detects pieces of preceding vehicle information 50 to identify the inter-vehicle distance and relative speed of the self-vehicle with respect to the preceding vehicle, and outputs the information 50 to the inter-vehicle distance control ECU 2.

The inter-vehicle distance control ECU 2 uses the preceding vehicle information 50 detected by the laser-radar sensor 1 as a basis to identify the inter-vehicle distance and relative speed between the preceding vehicle and- self-vehicle, and identifies the target speed for the inter-vehicle distance and relative speed, and outputs periodically the identified target speed to the engine ECU 3. The inter-vehicle distance control ECU 2 transmits to the engine ECU 3 the target speed information plus the time at which the preceding vehicle information 50 used for identifying the target speed is received from the laser-radar sensor 1, i.e., the sensor-information reception time.

The engine ECU 3 uses the target-speed data received from the inter-vehicle distance control ECU 2, and data from not-shown other sensors and/or ECUs in the vehicle real-time control system 100, as a basis to control the operation of actuators including the electronic throttle 4 and injector 5 to keep the proper inter-vehicle distance between the preceding vehicle and self-vehicle. The sensor-information reception time, which is added to the target-speed data, plus a predetermined valid period (acceptable delay time in the present embodiment) is compared with the current time to determine whether or not the received target-speed data has expired. If the data has expired, the target-speed data is linearly extrapolated to the current value, and the extrapolated results are used as a basis to control the operation of the electronic throttle 4 and injector 5.

The characteristics of the target-speed data will now be described.

The vehicle real-time control system 100 according to the present embodiment controls the inter-vehicle distance by controlling the vehicle-running speed based on the current inter-vehicle distance and relative speed to keep the proper inter-vehicle distance between the self-vehicle and preceding vehicle. The vehicle-running speed is thus ideally controlled based on the inter-vehicle distance and relative speed at the point of control.

The target-speed data is a value that is specified based on the sensor value from the laser-radar sensor 1 and that changes consistently depending on internal and external conditions of the vehicle. The target-speed data is thus a time-dependent data for use in the real-time control. The target-speed data is therefore ideally based on the signal from the laser-radar sensor 1 at the point of control of the vehicle-running speed. Because the signal transmission is time-consuming, it is impossible to control the running speed with the laser-radar sensor 1 at the exact point of control. It is thus considered that a certain level of time lag is within tolerance and the time-dependent data within the tolerance from the control point reflects the value at the control point.

In the present embodiment, it is determined that the time-dependent data for use in the real-time control reflects the value at the control point by using the fact as a reference that data-creation time plus a valid period is after the current time, i.e., the data has not expired.

Figure 2:
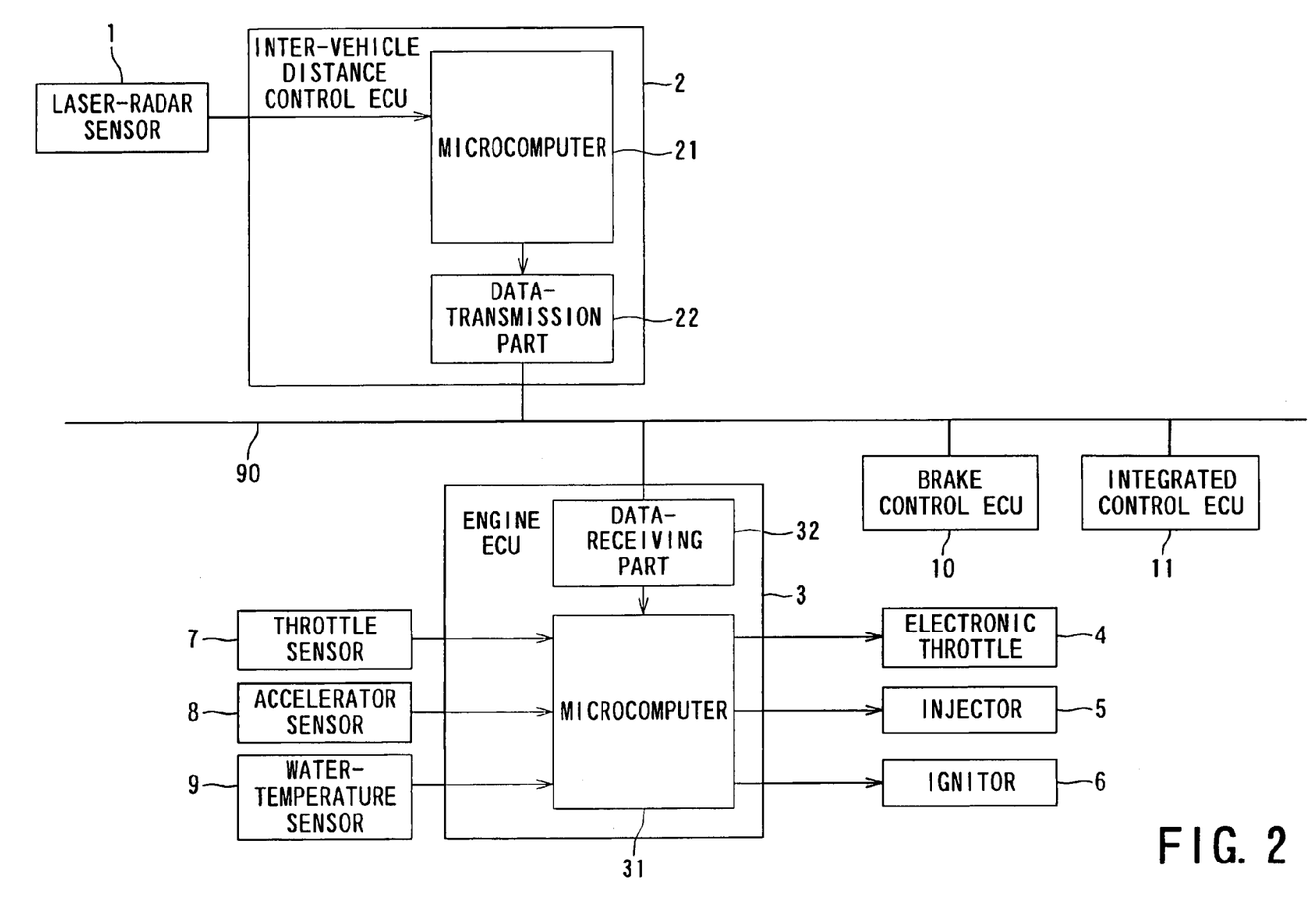
FIG. 2 shows a hardware configuration of the vehicle real-time control system.

FIG. 2 shows a hardware configuration of the vehicle real-time control system 100. This vehicle real-time control system 100 is equipped, as described in part, in advance, with a laser-radar sensor 1, inter-vehicle distance control ECU 2, engine ECU 3, electronic throttle 4, injector 5, as well as an ignitor 6, throttle sensor 7, accelerator sensor 8, water-temperature sensor 9, brake control ECU 10, integrated control ECU 11, and others. The inter-vehicle distance control ECU 2, engine ECU 3, brake control ECU 10, integrated control ECU 11 connect to each other through the communication line established by an in-vehicle LAN 90.

The laser-radar sensor 1 resides on the front of a vehicle (self-vehicle) on which the vehicle real-time control system 100 is mounted. The laser-radar sensor 1 outputs a laser beam toward a vehicle preceding the self-vehicle, and receives the relevant laser reflected by the preceding vehicle. The laser-radar sensor 1 also outputs to a microcomputer 21 in the inter-vehicle distance control ECU 2 the signals of the laser-output-time and laser-reception time, and laser frequency. The laser-radar sensor 1 outputs and receives the laser, and outputs the time information in a periodical manner (for example, every 32 ms).

The inter-vehicle distance control ECU 2 is provided, as mentioned above, the microcomputer 21 and data-transmission part 22.

The microcomputer 21 is provided with a not-shown CPU, RAM, ROM, and flash memory. The CPU runs a program stored in the ROM or flash memory, and also performs operations based on the program and the signal received from the laser-radar sensor 1. In those operations, the CPU reads out data from these RAM, ROM, and flash memory, writes data in the RAM, and outputs to the data-transmission part 22 the data to be transmitted to the engine ECU 3, whenever it is necessary. The description below will take the processing, in which the CPU in the microcomputer 21 runs a program as the processing in which the microcomputer 21 runs the program.

The data-transmission part 22 includes a not-shown transmission buffer that is a memory for transmission. The data-transmission part 22 stores the data input from microcomputer 21 into the transmission buffer, and outputs the data stored in the transmission buffer to the in-vehicle LAN 90 at a predetermined timing.

The engine ECU 3 is also provided with a microcomputer 31 and a data-receiving part 32.

The microcomputer 31 includes a not-shown CPU, RAM, ROM, and flash memory. The CPU runs a program stored in the ROM or flash memory, and also performs operations based on the program and the signals received from the various sensors 7 to 9. In those operations, the CPU reads cut data from these RAM, ROM, flash memory, and receiving buffer in the data-receiving part 32, and writes data in the RAM and flash memory, if required. The throttle sensor 7 detects information inductive of an electronic-throttle opening in engine of the vehicle and outputs it to the microcomputer 31. The accelerator sensor 8 detects an extent to which the accelerator is depressed in the vehicle, and outputs it to the microcomputer 31. The water-temperature sensor 9 detects an engine-cooling-water temperature and outputs it to the microcomputer 31. The description below will take the processing, in which the CPU embedded in the microcomputer 31 runs a program as the process in which microcomputer 31 runs the program.

The data-receiving part 32 comprises a not-shown receiving buffer that is a memory for receiving. The data-receiving part 32 stores in the receiving buffer the data that is outputted to the in-vehicle LAN 90 at a predetermined tinning from the inter-vehicle distance control ECU 2, brake control ECU 10, and integrated control ECU 11.

The electronic throttle 4 is an actuator that uses the control signal from the microcomputer 31 as a basis to electronically control the throttle opening with a motor.

The injector 5 is an actuator that uses the control signal from the microcomputer 31 as a basis to control amount and timing of the fuel injection into the engine.

Further, the ignitor 6 is an actuator that uses the control signal from the microcomputer 31 as a basis to control the fuel ignition timing in the engine.

The brake control ECU 10 is an ECU that uses information showing a depressed amount of the brake pedal in the vehicle as a basis to control the operation of the vehicle brake. The brake control ECU 10 cutouts data corresponding to the depressed amount of the brake pedal to the in-vehicle LAN 90 at a predetermined timing as brake pedal information.

The integrated control ECU 11 uses the various pieces of information generated in the vehicle that is received through the in-vehicle LAN 90 or any other communication means as a basis to calculate a target torque of the vehicle, and outputs the target torque value to the in-vehicle LAN 90 at a predetermined timing.

In the above-described hardware configuration of the vehicle real-time control system 100, the laser-radar sensor 1, inter-vehicle distance control ECU 2, engine ECU 3, electronic throttle 4, injector 5, ignitor 6, throttle sensor 7, accelerator sensor 8, water-temperature sensor 9, brake control ECU 10, and integrated control ECU 11 are previously set up such that they are synchronized on the same time base.

Figure 3:
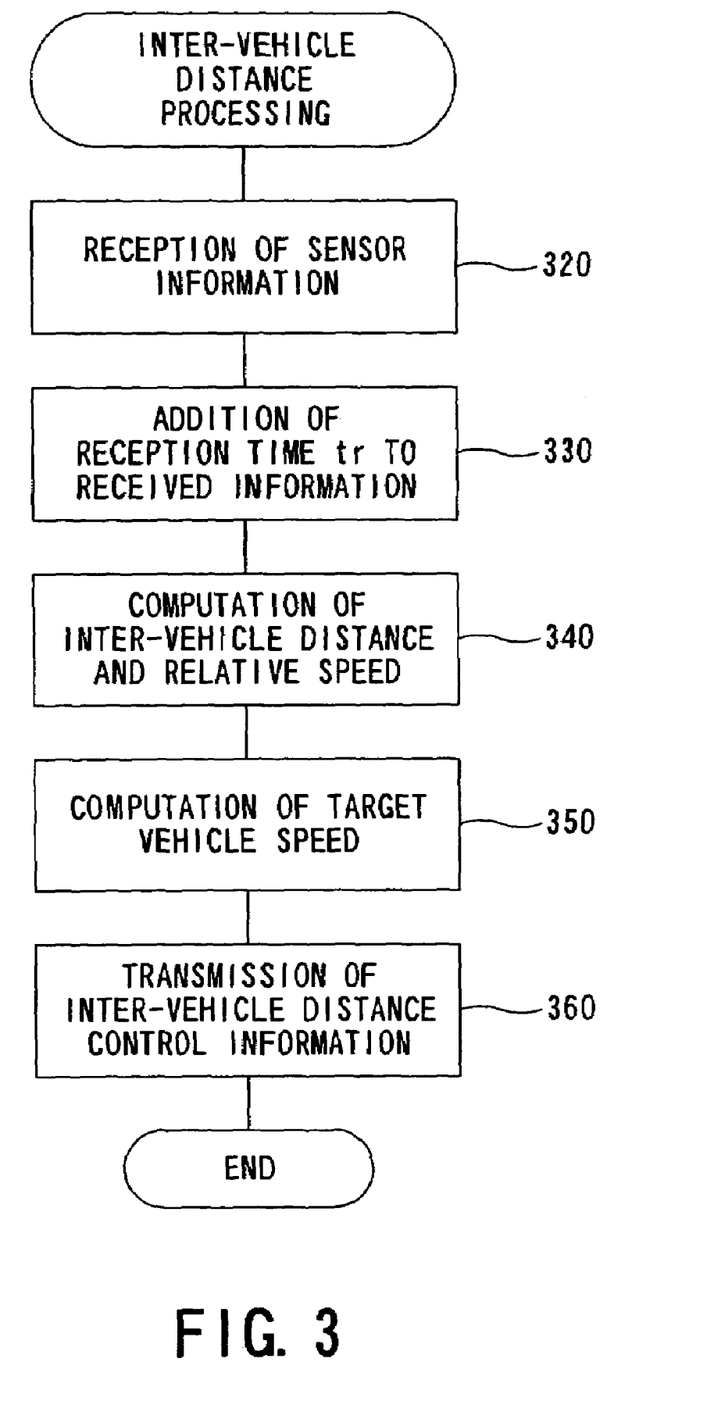
FIG. 3 shows a flowchart showing a program executed by a microcomputer.

The operation of the vehicle real-time control system 100 will now be described. FIG. 3 shows a flowchart of a program executed by the microcomputer 21 placed in the inter-vehicle distance control ECU 2.

The microcomputer 21 starts to run the program upon the input of a signal from the laser-radar sensor 1. First, at step 320, the microcomputer 21 receives the signal from the laser-radar sensor 1, specifically, a detected data including information of the time at which the laser-radar sensor 1 outputs the laser beam, the time at which the laser-radar sensor 1 receives the relevant-laser reflection, and the frequency of the reflected wave of the relevant laser, and then stores the data in a predetermined area in the RAM.

At step 330, the received information is added with information indicative of a reception time $t_r$. More specifically, the current time $t_r$ is stored in the RAM, after being associated with the data received and stored in the RAM at step 330. The current time $t_r$ is almost the same as the time at which the laser-radar sensor 1 detects the reflected laser and the time at which the inter-vehicle distance control ECU 2 receives (detects) data detected by the sensor 1.

At step 340, data of the inter-vehicle distance and relative speed are then computed. More specifically, the time before the reflected wave of the output radar returns is used to identify the distance to the preceding vehicle, and the reflected-wave frequency change due to Doppler effect is used to identify the relative speed to the preceding vehicle.

At step 350, the relationship between the inter-vehicle distance and the relative speed is then used as a basis to compute a target vehicle speed using the well-known method. A target upper-limit vehicle speed may be computed rather than the target vehicle speed.

Next, at step 360, a process is performed for transmitting inter-vehicle distance control information data to the in-vehicle LAN 90. More specifically, the reception time $t_r$ identified at step 330, and the inter-vehicle distance control information as the time-dependent data including target vehicle speed identified at step 350 are transmitted to the data-transmission part 22. The process then ends.

Such a process by the microcomputer 21 uses the detected data from the laser-radar sensor 1 as a basis to determine the target vehicle speed. The target vehicle speed is added with the detection time (or reception time) of the above-described detected data to produce the inter-vehicle distance control information, which is then outputted to the data-transmission part 22. The current time $t_r$ is almost the same as the time at which the laser-radar sensor 1 detects the detected data and the time at which the inter-vehicle distance control ECU 2 receives the detected data, because the processing for identifying the current time at step 330 is performed right after the detected data is received at step 320.

After receiving the inter-vehicle distance control information, the data-transmission part 22 stores the inter-vehicle distance control information into the transmission buffer, and sends the inter-vehicle distance control information to the in-vehicle LAN 90 at a predetermined time. The data-receiving part 32 in the engine ECU 3 receives data flowing through the in-vehicle LAN 90 that flows at a time instant at which the data-transmission part 22 sends out the inter-vehicle distance control information. The data-receiving part 32 thus receives the inter-vehicle distance control information sent by the data-transmitting part 22 in the inter-vehicle distance control ECU 2, and stores the relevant information into the own receiving buffer.

Figure 4:
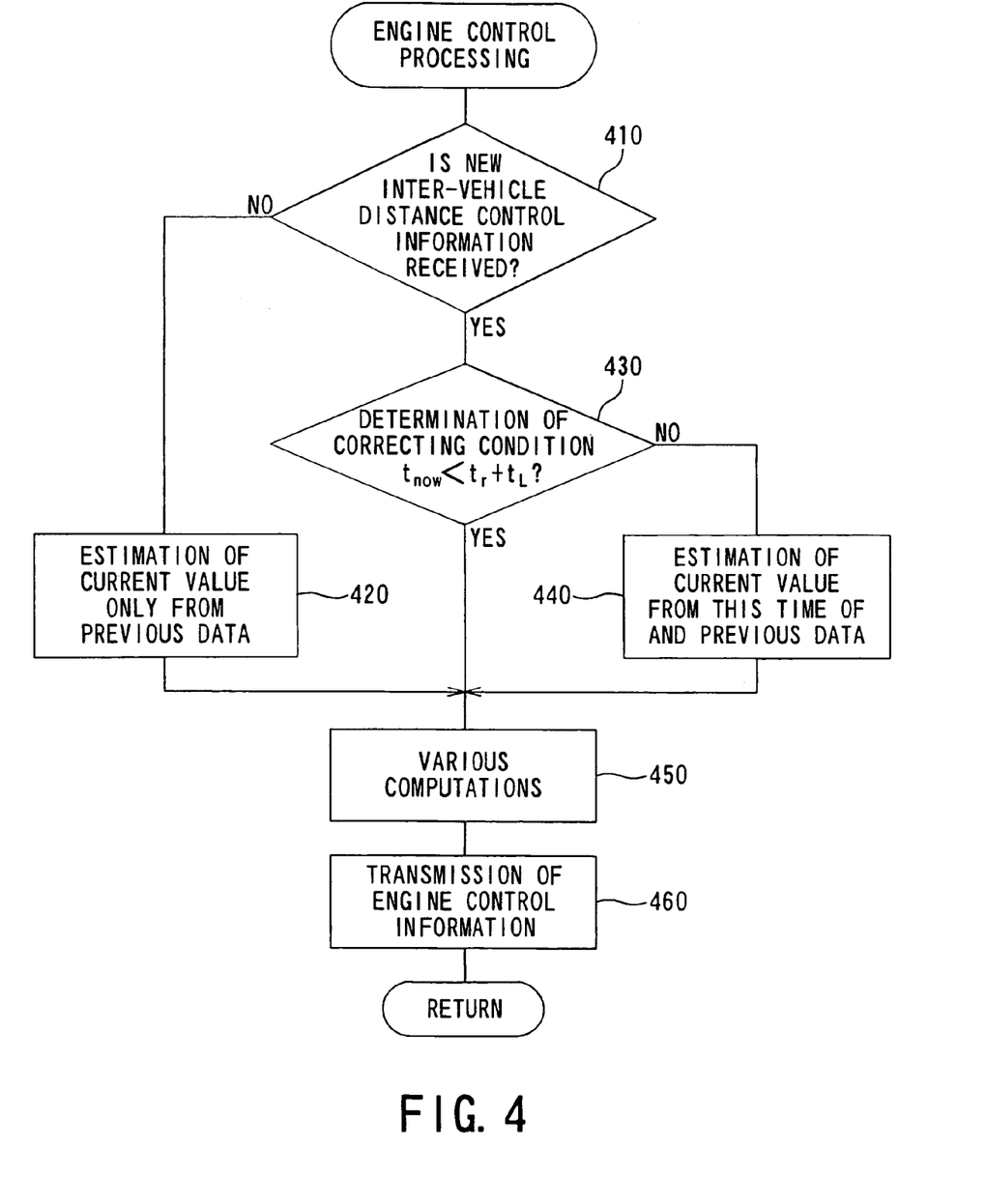
FIG. 4 shows a flowchart showing a program executed by microcomputer.

A description will row be given to the operation of the microcomputer 31 placed in the engine ECU 3, which receives the inter-vehicle distance control information. FIG. 4 is a flowchart of a program run by the microcomputer 31. The microcomputer 31 runs the program periodically (for example, every 32 ms).

First, at step 410, it is determined whether or not new inter-vehicle distance control information is received. More specifically, the inter-vehicle distance control information data is read out from the receiving buffer in the data-receiving part 32 and stored in the flash memory, and is then determined to be the new inter-vehicle distance control information or not. The inter-vehicle distance control information stored in the receiving buffer is determined to be the new one or not, by comparing the inter-vehicle distance control information data that is read out and stored in the flash memory at step 410 when this program is run at the last time and the inter-vehicle distance control information data that is read out at step 410 this time, on the detection time $t_r$ of the detected data included in both the inter-vehicle distance control information data, and by determining whether this-time data is after the last-time data. If the new inter-vehicle distance control information is not received, the processing goes to step 420. If the new inter-vehicle distance control information is received, the processing goes to step 430.

At step 420, the current value is estimated by linear extrapolation only from the previous data, i.e., from the inter-vehicle distance control information read out at step 410 when this program is run before the last time. The inter-vehicle distance control information read out at step 410 is the value at the time at which the detected value from the laser-radar sensor 1 is detected, on which value the inter-vehicle distance control information is based. The current value refers to the estimated value that is estimated to be taken by the inter-vehicle distance control information if the relevant inter-vehicle distance control information is created at the current time based on the detected value from the laser-radar sensor 1. This linear extrapolation method will be described in detail later.

At step 430, the correcting condition is then determined. More specifically, it is determined whether the detection time $t_r$ of the detected data included in the new inter-vehicle distance control information read out at step 410 plus the valid period $t_L$ is after the current time $t_{now}$. The valid period $t_L$ is the reference time by which the detection time of the detected data is compared with the current time to determine whether the detection time is the old data that has expired. This valid period $t_L$ is previously stored in the flash memory or ROM in the microcomputer 31. If "$t_r+t_L$" is after $t_{now}$, i.e., the new inter-vehicle distance control information has not expired, the process goes to step 450. If "$t_r+t_L$" is not after $t_{now}$, i.e., the new nter-vehicle distance control information has expired, the processing goes to step 440.

At step 440, the current value is estimated from this-time data and previous data, i.e., from the inter-vehicle distance control information read out at step 410 when this program is run at this time and before the last time. More specifically, this-time inter-vehicle distance control information is corrected to the current value by linear extrapolation from this-time data and previous data in the inter-vehicle distance control information. This correction will be described in detail later.

At step 450, the target speed in the inter-vehicle distance control information received at step 410, or the current value of the target speed in the inter-vehicle distance control information estimated at step 420 or 440 is used as a basis to compute the opening and open/close timing of the electronic throttle 4, injection amount and injection timing of the injector 5, ignition timing of the ignitor 6, and the like. These values are computed further based on signals that are inputted from the throttle sensor 7, accelerator sensor 8, and water-temperature sensor 9, and information that is transmitted from the brake control ECU 10 and the integrated control ECU 11, and stored in the receiving buffer in the data-receiving part 32.

At step 460, the various amounts computed at step 450, i.e., the control signals based on the engine control information, are then outputted to various actuators such as electronic throttle 4, injector 5, and ignitor 6. The processing of program in FIG. 4 then ends.

Running such a program causes the microcomputer 31 to periodically determine whether or not the new inter-vehicle distance control information is received. If the new inter-vehicle distance control information is not received, the current value is estimated from the previous inter-vehicle distance control information by linear extrapolation. If the new inter-vehicle distance control information is received, for the case of the new inter-vehicle distance control information that has expired, the current value is corrected and estimated from this-tire inter-vehicle distance control information and the previous inter-vehicle distance control information by linear extrapolation. For the case of the new inter-vehicle distance control information that has not expired, the inter-vehicle distance control information is directly the current value. Based on these current values, the actuators such as injector 5, ignitor 6, and throttle sensor 7 are driven for the vehicle real-time control.

The linear extrapolation performed at steps 420 and 440 will now be described with reference to FIG. 5.

Figure 5:
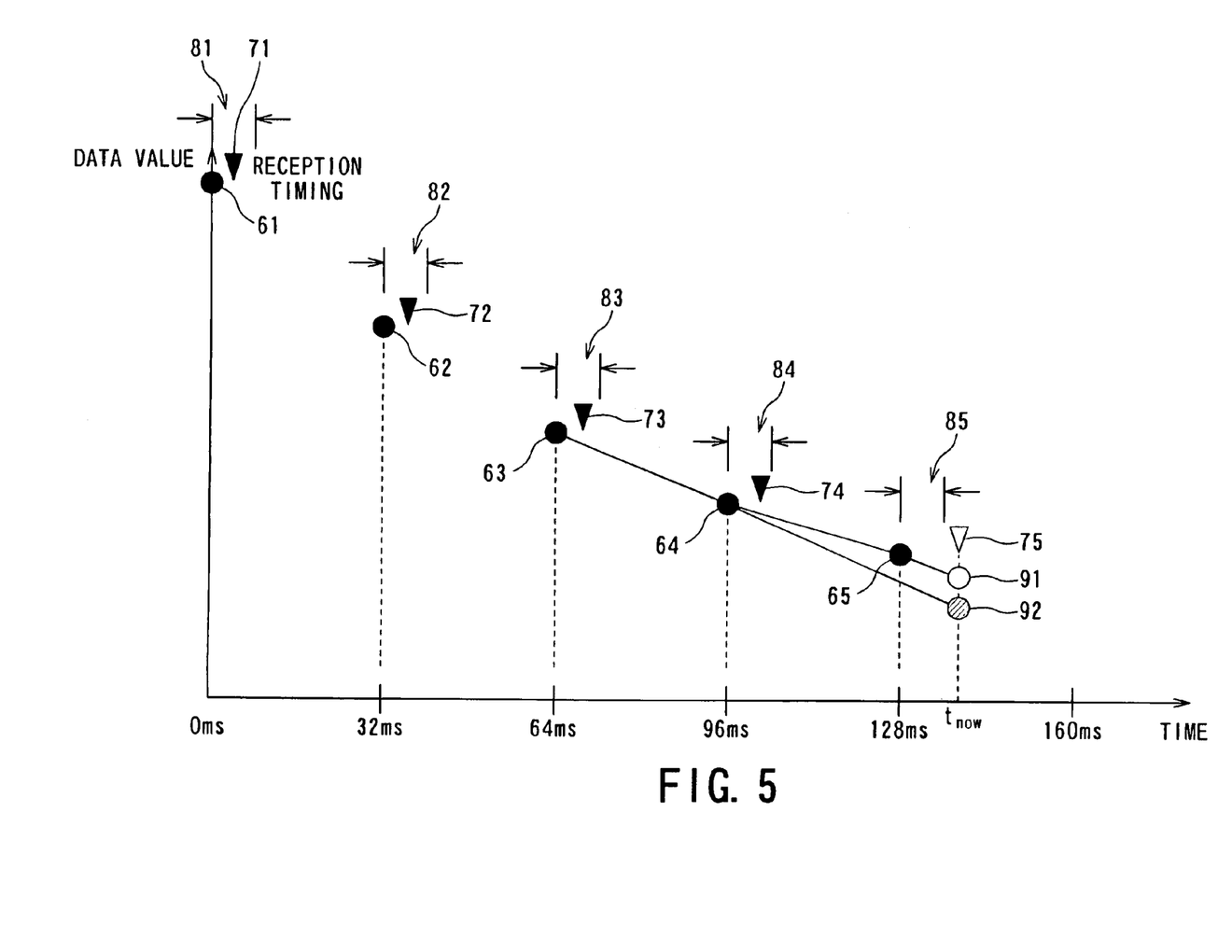
FIG. 5 illustrates data extrapolation performed by the microcomputer.

FIG. 5 shows a two-dimensional coordinate space with x-axis being the time and y-axis being the data value (which is the target vehicle speed in this embodiment). This two-dimensional coordinate space indicates closed circles 61 to 65 that each denotes the detection time $t_r$ of the detected data on which the data value at that circle is based. Each of inverse triangles 71 to 75 denotes the time at which the microcomputer 31 placed in the engine ECU 3 receives the data of the closed circles 61 to 65 and uses the data as a basis to perform various computations and controls. The specified time ranges 81 to 85 denote the valid period (acceptable delay time) $t_L$.

The closed circles 61 to 64 denote the data with the detection time $t_r$ of 0 msec, 32 msec, 64 msec, and 96 msec, respectively. The microcomputer 31 receives each of these data (step 410), variously computes based on it (step 450), and controls it (step 460) at the timing within the valid period $t_L$ from the detection time $t_r$, as denoted by the inverse triangles 71 to 74. The processing at step 410 and 430 will determine this case to be positive, and then the various computations can directly use the received data without correction.

The closed circle 65 denotes the data with the detection time $t_r$ of 128 msec. The microcomputer 31 receives this data, variously computes based on it, and controls it at a delayed timing $t_{now}$ after the timing within the valid period $t_L$ from the detection time $t_r$, as denoted by the inverse triangle 75. Step 410 will determine this case to be positive, but step 430 will determine this case to be negative, and then step 440 will linearly extrapolate the received data. This linear extrapolation uses the detection times and data values of the data received the last time (corresponding to the circle 64) and data received this time (corresponding to the circle 65) by microcomputer 31 to derive a time-dependent linear function indicating data values, and provides the corrected value that is the data value of the linear function (corresponding to the circle 91) at the timing of this-time computation and control (corresponding to the inverse triangle 75).

If the data with the detection time $t_r$ of 128 msec denoted by the closed circle 65 is not received even at the timing $t_{now}$ of the receiving, computation, and control as denoted by the inverse triangles 75, step 410 will determine this case to be negative, and then step 420 will linearly extrapolate only the previous data. This linear extrapolation uses the detection times and data values of the data received before the last time (corresponding to the circle 63) and data received the last time (corresponding to the circle 64) by the microcomputer 31 to derive a time-dependent linear function indicating data values, and provides the corrected value that is the data value of the linear function (corresponding to circle 92) at the timing of this-time computation and control (corresponding to the inverse triangle 75).

In the operation of the vehicle real-time control system 100 as described above, the microcomputer 31 in engine ECU 3 uses as a basis a degree of newness (freshness) of the target-speed data (corresponding to the transmitted/received data) for the vehicle real-time control, i.e., the detection time or reception time of the detected data from the laser-radar sensor 1 on which the target-speed data is based on, to determine whether the relevant data has expired (see step 430). This microcomputer 31 then processes the transmitted/received data based on the determined results (see steps 440, 450, and 460). The vehicle real-time control system 100 can thus perform processing for keeping the proper inter-vehicle distance, i.e., processing for reducing mismatching in the vehicle real-time control, based on whether the transmitted/received data is transferred within a proper time.

The microcomputer 31 determines whether the relevant data has expired, based on the degree of newness of the transmitted/received data, as well as the valid period of the transmitted/received data, and the current time.

The microcomputer 31 processes the transmitted/received data based on the determined results, in such a way that if the transmitted/received data has expired, the transmitted/received data value is corrected to the current value by linear extrapolation, to reduce the mismatching in the vehicle real-time control.

Such newness information about the detected data is added by the microcomputer 21 in the inter-vehicle distance control ECU 2, which transmits inter-vehicle distance control information to the engine ECU 3 (see step 330).

Second Embodiment

A second embodiment of the present invention will now be described with reference to FIG. 6.

This embodiment differs from the first embodiment in that the first embodiment previously stores the expiration time $t_L$ information of the transmitted/received data into the ROM or flash memory owned by the microcomputer 31 of the engine ECU 3, while the second embodiment stores the expiration time $t_L$ information into the ROM or flash memory owned by the microcomputer 21 of the inter-vehicle distance control ECU 2, and adds this information to the transmitted/received data that is to be transmitted to the engine ECU 3 by the microcomputer 21.

The vehicle real-time control system 100 according to the second embodiment has the similar hardware configuration to that of the first embodiment. Only the differences between the operations of the vehicle real-time control system 100 of the second embodiment and the first embodiment will be described below.

Figure 6:
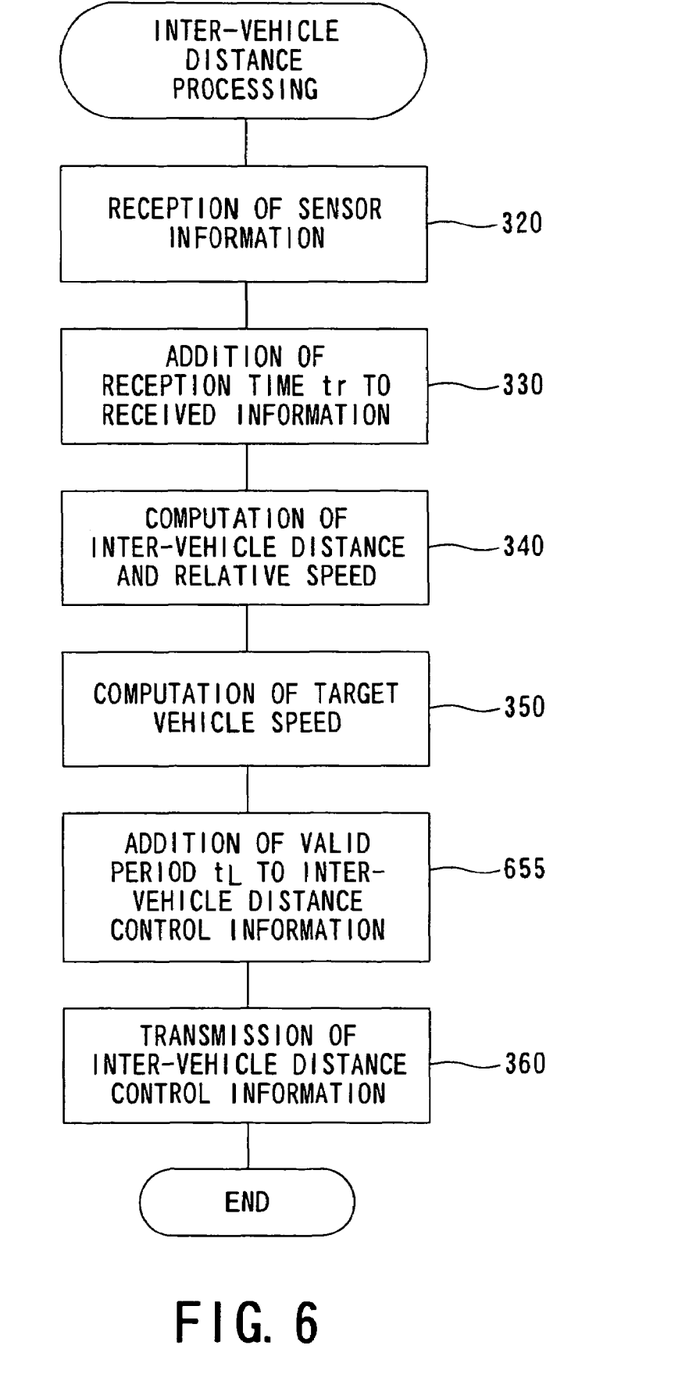
FIG. 6 shows a flowchart showing a program performed by a microcomputer according to a second embodiment of the present invention.

FIG. 6 shows a flowchart of the program that is read out and run by the microcomputer 21 according to the second embodiment. This program differs from the program run by the microcomputer 21 in the first embodiment (see FIG. 3) in that the processing at step 655 intervenes between step 350 and step 360. Note that the steps with the same symbols in FIG. 3 and FIG. 6 perform the same processes.

At step 655, the valid period $t_L$ is added to the inter-vehicle distance control information. More specifically, the valid period $t_L$ data previously stored in the ROM or flash memory in the microcomputer 21 is read out and added to the target vehicle speed calculated at step 350.

The processing at step 360 thus transmits the reception time $t_r$, valid period $t_L$, and inter-vehicle distance control information having target-speed information to the engine ECU 3 via the data-transmission part 22 and the in-vehicle LAN 90.

The operation of the microcomputer 31 in the engine ECU 3 will now be described. The microcomputer 31 runs the same program as shown in FIG. 4. At step 430, however, a valid period $t_L$ is used that is included in the data inter-vehicle distance control information read out from the receiving buffer at step 410.

The microcomputer 21 adds the valid period $t_L$ to the transmitted/received data as described above, so that valid period $t_L$ does not need to be set up at the engine ECU 3, which receives the transmitted/received data. Such a configuration can nave the effect of eliminating the setup and reducing the memory capacitance, if, for example, one ECU transmits the transmitted/received data to a plurality of ECUs and each of reception ECUs determines the correcting condition shown at step 430 in FIG. 4.

(Modifications)

In each of the above-described embodiments, the transmitted/received data that is transmitted and received in the vehicle real-time control system 100 for the real-time control is one type of the inter-vehicle distance control information transmitted from the inter-vehicle distance control ECU 2 to the engine ECU 3. Various types of transmitted/received data for real-time control, however, may be transferred between ECUs arranged in the vehicle real-time control system 100.

In this case, each transmitted/received data may or may not have a constant valid period for that transmitted/received data. For example, a wide time-varying transmitted/received data can be set to have a short valid period, and a small time-varying transmitted/received data can be set to have a long valid period. This is based on the fact that the wide time-varying data may become invalid data in a relatively short time. For example, the sensor value of the engine-cooling-water temperature can be a small time-varying data, and the engine rotation speed can be a wide time-varying data.

The valid period may also be different for different contents of the real-time control that uses the relevant transmitted/received data. The content of the real-time control refers, for example, to how necessary that control is done in real-time, or how important that control is for the vehicle running. In these cases, the transmitted/received data for the control that is more necessary to be in real-time can have a shorter valid period, and the transmitted/received data for more important control can have a shorter valid period, to perform a flexible process suitable for the control content. For example, it is highly necessary that the auto cruise control in this example is done in real-time, but it is relatively little necessary that the air conditioner control for adjusting temperature in the vehicle compartment is done in real-time.

The valid period may be different for different types of the sensor outputting the detected data on which the relevant transmitted/received data is based on.

In the above-described embodiments, the laser-radar sensor 1 outputs information that is received by the inter-vehicle distance control ECU 2, and the ECU 2 outputs the transmitted/received data that is directly received by the engine ECU 3 for controlling actuators for the real-time control. But this may not be so. Alternatively, any other ECUs may intervene between the inter-vehicle distance control ECU 2 and the engine ECU 3.

It is sufficient that the processing of the engine ECU 3 for ECU real-time control is based on the transmitted/received data output from the inter-vehicle distance control ECU 2.

The transmitted/received data may not be based on the outputs from sensors such as the laser-radar sensor 1, and may be based on any data that indicates time-varying amount for use in the real-time control.

In the above-described embodiments, the degree of newness (freshness) of the transmitted/received data refers to the detection time of the detected data on which that transmitted/received data is based, and the reception time of that detected data in the inter-vehicle distance control ECU 2. Alternatively, the data of the degree of newness may be, for example, the expiration time of the relevant data, i.e., the time at which that data expires. The expiration time may thus only be transmitted, which can reduce the communication load.

The degree of newness of the transmitted/received data may represent the time at which that transmitted/received data is computed. This can identify the degree of newness of the transmitted/received data even if, for example, that transmitted/received data is not based on the sensor output.

In the above-described embodiments, the inter-vehicle distance control ECU 2 adds the degree of newness of the data, but this may not be so. Alternatively, for example, the detected data itself from laser-radar sensor 1 may be provided with the detection time of that detected data as the degree of newness.

In the above-described embodiments, the storage medium owned by the inter-vehicle distance control ECU 2 or the engine ECU 3 stores the valid-period information. Alternatively, the storage medium owned by other ECUs may store the valid-period information, and the microcomputer 31 in the engine ECU 3 may receive the valid-period information from the relevant other ECUs.

In each of the above-described embodiments, the expiration time $t_L$ is a fixed value, but it may vary in time. The expiration time $t_L$ may vary, for example, based on the vehicle running distance. This makes it possible to flexibly accommodate the sensor-sensitivity changes due to the vehicle aging.

In each of the above-described embodiments, the laser-radar sensor 1, inter-vehicle distance control ECU 2, engine ECU 3, brake control ECU 10, and integrated control ECU 11 are previously set up such that they are synchronized on the same time base. Alternatively, they may be synchronized on the same time base by each ECU transmitting and receiving the time information via the in-vehicle LAN 90.

In each of the above-described embodiments, if a data is determined to have expired, the current value is estimated by linear extrapolation. But the method is not limited to the linear extrapolation, and other methods can be used for the estimation.

The present invention may be embodied in several other forms without departing from the spirit thereof. The present embodiments as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A system for controlling, in real times, states of a vehicle, in which the real-time control is performed based on time-dependent data transmitted and received among a plurality of ECUs (electronic control units) dedicated to the control of the states of the vehicle, the system comprising:
    a first ECU, which is one of the ECUs, comprises transmitting means for transmitting the time-dependent data and addition means for adding information indicative of a degree of newness of the time-dependent data obtained in the first ECU to the time-dependent data to be transmitted by the transmitting means; and
    a second ECU, which is another of the ECUs, which comprises:
        a determination unit determining whether or not the time-dependent data has expired for the real-time control based on the degree of newness of the time-dependent data to be received from the first ECU; and
        a processing unit performing processing with the time-dependent data based on results of the expiration determined by the determination unit, the processing having the time-dependent data adapted to the real-time control.

2. The system according to claim 1, further comprising:
    a sensor detecting information about the states of the vehicle as the time-dependent data to be given to the first ECU, the first ECU transmitting the time-dependent data to the second ECU either directly or indirectly.

3. The system according to claim 2, wherein:
    the degree of newness of the time-dependent data is a time instant at which the detector has detected the time-dependent data.

4. The system according to claim 3, further comprising:
    means providing the time-dependent data with a valid period showing that the time-dependent data is valid for the real-time control,
    wherein the determination unit is configured to perform the determination on both of the basis of the degree of newness of the time-dependent data and the valid period to the time-dependent data.

5. The system according to claim 1, wherein:
the degree of newness of the time-dependent data is a time instant at which the time-dependent data is transmitted from the first ECU to the second ECU.

6. The system according to claim 5, further comprising:
means providing the time-dependent data with a valid period showing that the time-dependent data is valid for the real-time control,
wherein the determination unit is configured to perform the determination on both of the basis of the degree of newness of the time-dependent data and the valid period to the time-dependent data.

7. The system according to claim 1, wherein:
the degree of newness of the time-dependent data is a valid time instant at which the time-dependent data expires.

8. The system according to claim 7, wherein:
the determination unit is configured to perform the determination on both of the basis of the valid time instant at which the time-dependent data expires and a current time instant.

9. The system according to claim 1, wherein:
the processing unit is configured to correct the time-dependent data based on both of the degree of newness and a current time instant, when it is determined by the determination unit that the time-dependent data has expired.

10. The system according to claim 4, wherein:
the valid period of the time-dependent data depends on what kinds of real-time control is performed using the time-dependent data.

11. The system according to claim 6, wherein:
the valid period of the time-dependent data depends on what kind of real-time control is performed using the time-dependent data.

12. The system according to claim 7, wherein:
the valid time instant depends on what kind of real-time control is performed using the time-dependent data.

13. The system according to claim 2, wherein:
the second ECU has a memory memorizing information indicative of a valid period showing that the time-dependent data is valid for the real-time controls, and
the determination unit is configured to perform the determination based on the information indicative of both the degree of newness added to the time-dependent data and the valid period memorized by the memory.

14. The system according to claim 2, wherein:
the addition means of the first ECU is configured to add, to the time-dependent data, information indicative of both of the degree of newness and a valid period showing that the time-dependent data is valid for the real-time control, and
the determination unit is configured to perform the determination based on the information indicative of both the degree of newness and the valid time which are added by the addition means.

15. The system according to claim 14, further comprising:
a sensor detecting information about the states of the vehicle, the information being given as the time-dependent data to the first ECU,
wherein the valid period for the time-dependent data depends on a type of the sensor.

16. The system according to claim 2, further comprising:
providing means providing the time-dependent data with data of a valid period showing that the time-dependent data is valid for the real-time control, the providing means being incorporated in either the first or second ECU,
wherein the determination unit is configured to use, in addition to the degree of newness of the time-dependent data, the valid period to perform the determination.

17. A system for controlling in real time states of a vehicle, in which the real-time control is performed based on time-dependent data transmitted and received among a plurality of ECUs (electronic control units) dedicated to the control of the states of the vehicle, the system comprising:
a first ECU, which is one of the ECUs, comprises transmitting means for transmitting the time-dependent data and addition means for adding information indicative of a degree of newness of the time-dependent data obtained in the first ECU to the time-dependent data to be transmitted by the transmitting means; and
a second ECU, which is another of the ECUs, which comprises:
determination means determining whether or not the time-dependent data has expired for the real-time control based on the degree of newness of the time-dependent data to be received from the first ECU; and
processing means performing processing with the time-dependent data based on results of the expiration determined by the determination means, the processing having the time-dependent data adapted to the real-time control.

18. A receiving electronic control unit (ECU), which belongs to a plurality of ECUs in charge of controlling in real time states of a vehicle based on time-dependent data in which the states of the vehicle is reflected, receives the time-dependent data transmitted from a further ECU of the plurality of ECUs, the receiving electronic control unit comprising:
receiving means for receiving the time-dependent data from the further ECU, information indicative of a degree of newness of the time-dependent data obtained in the further ECU being added to the time-dependent data to be received;
determination means determining whether or not the time-dependent data that has been received has expired for the real-time control based on the degree of newness of the time-dependent data received by the receiving means; and
processing means performing processing with the time-dependent data based on results of the expiration determined by the determination means, the processing having the time-dependent data adapted to the real-time control.

19. A transmitting electronic control unit (ECU), which belongs to a plurality of ECUs in charge of controlling in real time states of a vehicle based on time-dependent data in which the states of the vehicle is reflected, transmits the time-dependent data to a further ECU of the plurality of ECUs, the transmitting electronic control unit comprising:
means for either receiving the time-dependent data from a sensor to detect the states of the vehicle or producing the time-dependent data;
means for adding information indicative of a degree of newness of the time-dependent data obtained in the transmitting electronic control unit to the received or produced time-dependent data; and
means for transmitting the time dependent data with the information indicative of the degree of newness.

20. A method of preparing time-dependent data used for controlling in real time states of a vehicle, in which the real-time control is performed based on the time-dependent data transmitted and received among a plurality of ECUs (electronic control units) dedicated to the control of the states of the vehicle, the method comprising:

making a specified ECU among the plurality of ECUs:
- (i) either receive the time-dependent data from a sensor to detect the states of the vehicle or produce the time-dependent data by calculation,
- (ii) add information indicative of a degree of newness of the time-dependent data to the received or produced time-dependent data, and
- (iii) transmit the time dependent data with the information indicative of the degree of newness to a further specified ECU among the plurality of ECUs; and making the further specified ECU:
- (iv) determine whether or not the time-dependent data that has been received has expired for the real-time control based on the degree of newness added to the time-dependent data; and
- (v) perform processing with the time-dependent data based on determined results of the expiration, the processing having the time-dependent data adapted to the real-time control.

21. The method according to claim 20, further comprising providing the time-dependent data with data of a valid period showing that the time-dependent data is valid for the real-time control,
wherein the determination step is configured to use, in addition to the degree of newness of the time-dependent data, the valid period to perform the determination.

22. The method according to claim 20, wherein the data of the valid period is provided in either the specified or further specified ECU.

23. The method according to claim 21, wherein the valid time depends on what kinds of real-time control is performed using the time-dependent data.

24. The method according to claim 20, wherein the degree of newness is any one of a time instant at which the time-dependent data is detected, a time instant at which the time-dependent data is transmitted from the specified ECU, or a valid time instant at which the time-dependent data expires.

25. A method for real-time control of a vehicle operational state wherein real-time sensor or other control input data is acquired by at least one electronic control unit (ECU) and transmitted to another ECU for subsequent use in controlling a vehicle operational state, said method comprising:
- adding timeliness data to acquired vehicle real-time control input data as a function of when such input data was acquired; and
- transmitting said input data together with said added timeliness data to an ECU in the vehicle which uses said input data to control a vehicle operational state as a function of both the acquired control input data and the added timeliness data so as to avoid adverse use of stale input control data and thereby achieve improved real-time control of the vehicle operational state.

26. A method as in claim 25, wherein said vehicle operational state at least in part determines spatial motion of the vehicle.

* * * * *